Dec. 18, 1951

J. YOUHOUSE 2,579,166

ELECTRIC ALARM CLOCK

Filed Nov. 22, 1944

3 Sheets-Sheet 1

INVENTOR
Joseph Youhouse
BY [signature]
ATTORNEY

Dec. 18, 1951 J. YOUHOUSE 2,579,166

ELECTRIC ALARM CLOCK

Filed Nov. 22, 1944 3 Sheets-Sheet 2

INVENTOR
Joseph Youhouse
BY [signature]
ATTORNEY

ELECTRIC ALARM CLOCK

Filed Nov. 22, 1944 3 Sheets-Sheet 3

INVENTOR
Joseph Youhouse
BY [signature]
ATTORNEY

Patented Dec. 18, 1951

2,579,166

UNITED STATES PATENT OFFICE 2,579,166

ELECTRIC ALARM CLOCK

Joseph Youhouse, Fairfield, Conn., assignor to Casco Products Corporation, Bridgeport, Conn., a corporation of Connecticut Application November 22, 1944, Serial No. 564,608

8 Claims. (Cl. 58—19)

This invention relates to clocks of the cyclometer or direct reading type.

Features of this invention disclosed herein but not claimed are claimed in my divisional application, Serial No. 607,065 filed July 25, 1945.

An object of the invention is to provide a cyclometer clock with a central sight opening, which may be made extremely thin, that is, of small dimension from front to rear thereby permitting the time to be read from wide angles.

This is accomplished by the provision, in a clock, of indicia-carrying members all of which are in the form of disks, or annuli, some of which are mounted alongside and edgewise to each other to lie substantially in a single plane, others being nested within one another and within the edgewise-mounted disks, also to lie substantially in a single plane. By this arrangement quick and complete reading of time, including hours, minutes. and seconds is possible, yet the front-to-rear dimensions of the clock may be made comparatively small while still retaining the balanced appearance afforded by a central sight opening for the numerals.

Another object of the invention is to provide a clock as above which is extremely simple, with comparatively few component parts, and foolproof in construction.

This is accomplished by a novel construction providing for simplified intermittent drive means between the succeeding disks or elements carrying indicia, and a simplified alarm-operating mechanism. The disks carrying the tens-of-minutes and "hour" numerals are mounted apart and lie substantially in a single plane edgewise to each other with their adjacent edge portions juxtaposed. The "hour" disk is provided along its periphery with notches for engagement with integral projections on the periphery of the tens-of-minutes disk whereby the latter drives the "hour" disk intermittently.

In the embodiment of the invention illustrated herein, the tens-of-minutes disk has two projections diametrically opposite each other, and two identical sets of equispaced numerals from 0 to 5 inclusive, the "hour" disk having but one set of equispaced numerals, from 1 to 12. Thus each half revolution of the tens-of-minutes disk advances the "hour" disk one-twelfth of a turn. The amount of turning which the tens-of-minutes disk does is therefore comparatively little, it being advanced one-twelfth of a revolution at a time, and by the provision of the said two sets of numerals on the tens-of-minutes disk, the "minute" disk, which has but one set of numerals from 0 to 9, may be smaller than the tens-of-minutes disk, and located so that its numerals are inside or enclosed by those of the latter.

By the provision of a simple pickup device, therefore, the one-tenth revolution periodic advance of the "minute" disk may be utilized to periodically advance the tens-of-minutes disk one-twelfth revolution, by allowing for a slight amount of lost motion. The arrangement of the hour and minute numerals, and the intermittent movements of the disks are such that at the sight-opening of the clock casing the numerals appear upright and in a straight line at all times except when being momentarily shifted, so that the time may be easily read.

The "second" disk of the clock is of still smaller diameter than the "minute" disk, and is located on the same axis so that the "second" numerals are enclosed or encircled by those of the "minute" disk.

A simplified intermittent drive is provided between the "second" disk and the "minute" disk, which latter drives the tens-of-minutes disk, this drive comprising a single lug on the "second" disk, engaging once during each revolution spur gearing connected with the "minute" disk.

The tens-of-minutes disk is cupped so that the "minute" disk may be nested therein, and the "minute" disk also cupped to permit nesting of the "second" disk, thereby resulting in a compact assembly presenting a substantially flat surface at the front of the clock.

In connection with the edgewise disposed "hour" and tens-of-minutes disks, a novel alarm mechanism is provided comprising comparatively few, economically-produceable parts.

A feature of this alarm mechanism is the provision of a combined alarm-setting and shut-off means whereby both of these functions may be accomplished by the provision of but one manually-operable knob. In the embodiment of the invention illustrated herein, the knob is mounted for both rotary and axial movement. The rotative position of the knob may indicate the time at which the alarm is set to operate, and the axial position of the knob determines whether the alarm is operative or not.

Other features and advantages will hereinafter appear.

Figure 2:
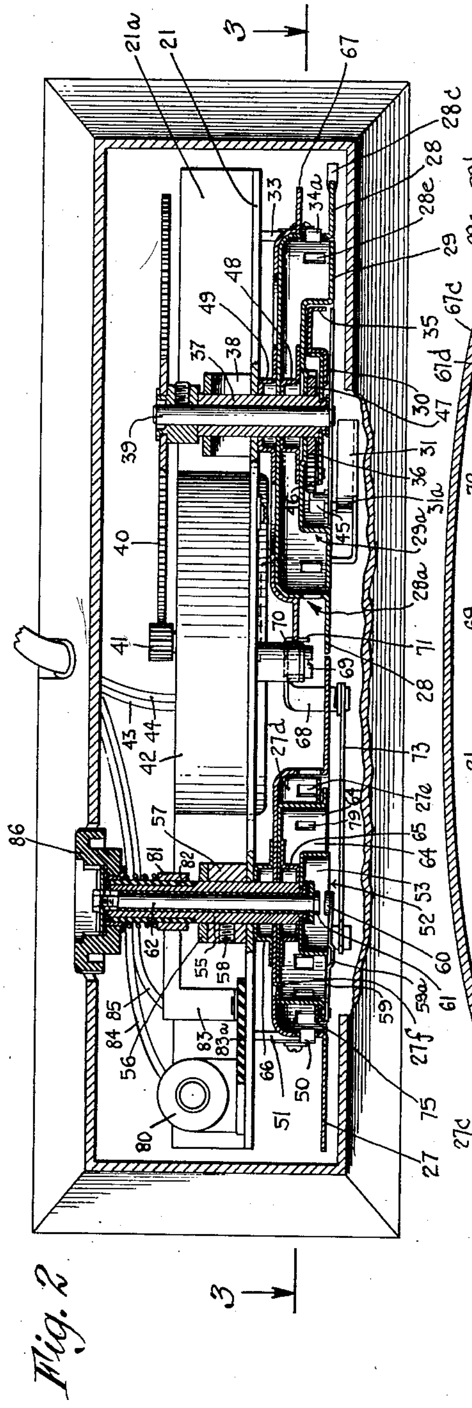
Fig. 2 is a horizontal section taken through the axes of the rotary indicia-carrying members.
Figure 1:
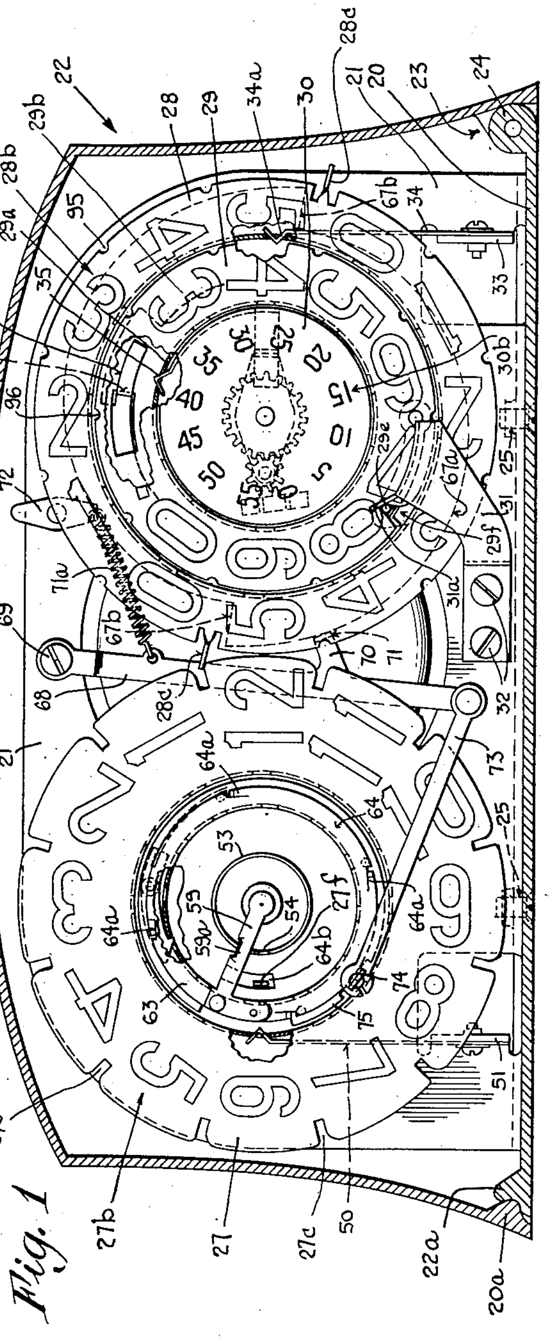
Figure 1 is a front elevation of the clock of this invention, with the front of the casing removed to show the mechanism.

Referring to Figs. 1 and 2, the improved clock of the present invention comprises a substantially rectangular elongate base 20 along the center of which is mounted a vertical support or frame 21 which carries essentially all of the time-indicating and alarm mechanisms of the clock. An ornamental cover or housing 22 is provided for the clock mechanism, the housing being adapted to engage the edges of the base 20 and having at one end hinge means 23 cooperating with hinge means 24 on the base whereby the cover may be swung upwardly to expose and permit access to the timing mechanism.

Preferably the base 20 and cover 22 at their coengaging ends opposite to the hinge means are provided with cooperating beads 20*a* and 22*a* respectively, which function as a detent to yieldably hold the cover 22 in closed position.

Referring to Fig. 2, the vertical frame 21 is in the form of a flat plate, having a flange 21*a* extending the length of its bottom edge, the flange being secured to the base 20 by screws 25 shown in Fig. 1.

Figure 4:
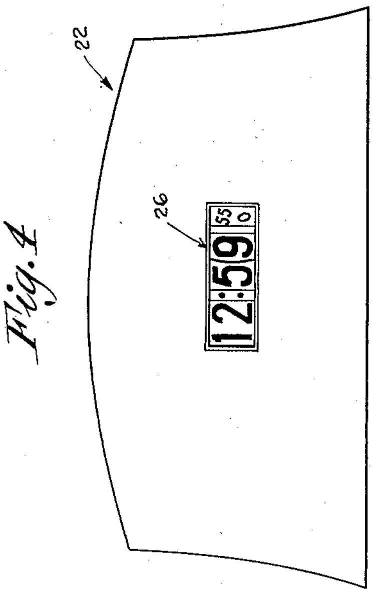
Fig. 4 is a front elevation or face view of the clock.

According to the present invention, a novel mechanism is provided, mounted on the plate 21 within the casing 22, for indicating the time through a central sight opening 26 of the casing (Fig. 4) whereby the thickness, or front-to-back dimension of the clock may be made comparatively small. In connection with this, the frame 21, by virtue of its comprising but a single plate, and having novel bearing means, cooperates with the timing mechanism to accomplish this result.

As shown in Figs. 1 and 2, the time-indicating mechanism of the clock comprises a plurality of disks or disk-like rotary members so shaped and arranged that they occupy little depth, yet indicia carried by the members will line up at the sight opening 26 of the casing, to thereby indicate the time.

According to the present preferred embodiment of the invention an "hour" disk 27 is provided, rotatably mounted on the frame plate 21 substantially in front of the left half thereof, as viewed in Fig. 1. Cooperating with the "hour" disk 27 there is provided a tens-of-minutes disk 28 rotatably mounted to substantially cover the right half portion of the frame 21, the disks 27 and 28 being located edgewise with respect to each other and lying substantially in the same plane. For indicating minutes, a "minute" disk 29 is provided of smaller diameter than the disk 28, mounted in axial alignment with the latter and to lie in substantially the same plane therewith. A still smaller disk 30 having indicia representing seconds is also provided, mounted to rotate about the common axis of the disks 28 and 29, and lying substantially in the common plane of these latter disks.

According to this invention the tens-of-minutes disk 28 has a central cupped portion 28*a* to provide clearance for the "minute" disk 29, and the latter has a central cupped portion 29*a* to enable it to clear the "second" disk 30 so that the faces of these three disks may be flush with each other. The "hour" disk 27 is provided with numerals 27*b*, the tens-of-minutes disk 28 with numerals 28*b*, the "minute" disk 29 with numerals 29*b*, and the "second" disk 30 with numerals 30*b*, which cooperate with each other when viewed through the sight opening 26 to indicate the time.

Further, according to the present invention, the numerals 28*b* of the tens-of-minutes disk 28 are arranged in two separate identical sets, which cooperate with a single set of numerals 29*b* provided on the "minute" disk 29, whereby the movements of the disks are simply related, and the latter disk in its periodic movements may once in each revolution drive the tens-of-minutes disk through use of an extremely simple mechanism. This arrangement of numerals also enables a simple intermittent drive mechanism to be provided for driving the "hour" disk 27 periodically from the tens-of-minutes disk 28, as well as for driving the "minute" disk 29 from the "second" disk 30.

Considering the intermittent drive means between the tens-of-minutes disk 28 and the "hour" disk 27, the latter is provided with a plurality of slots 27*c* equispaced about the periphery thereof, the number of slots corresponding to the nummer of indicia on the disk, which in the present case is twelve. As shown in Fig. 1 the slots 27*c* are preferably located so that they alternate with the indicia 27*b*.

For cooperation with the slots 27*c* the tens-of-minutes disk 28 is provided with a pair of projections 28*c* located on the periphery of the disk diametrically opposite each other. The indicia 28*b* of the tens-of-minutes disk comprise two sets of numerals from "zero" to "five" inclusive, and the projections 28*c* are located respectively between the adjacent "zeros" and "fives" of the numerals. The projections and slots are so shaped that once in each half revolution of the tens-of-minutes disk 28 a projection 28*c* will enter a slot 27*c* and drive the "hour" disk 27 through one-twelfth of a revolution. This drive means between the disks 27 and 28 is extremely economical to produce, since all of the slots 27*c* may be formed in one blanking operation, and since the projections 28*c* may be formed at the time of blanking of the disk 28, and then with but a simple subsequent operation twisted as indicated to lie in a plane at right angles to the disk.

When the tens-of-minutes disk 28 is intermittently driven counterclockwise, each time through one-twelfth of a revolution, the indicia from "zero" to "five" will be sequentially presented repeatedly through the sight opening 26 of the clock. Each time the "five" leaves the sight opening and the "zero" appears therein, the "hour" disk 27 will be caused to rotate clockwise through one-twelfth of a revolution, thereby causing the indicia from "one" to "twelve" thereon to sequentially appear through the sight opening.

Inasmuch as the intermittent rotative movements of the "minute" disk 29 are each through one-tenth of a revolution, which represents a greater arc than the one-twelfth-revolution movements of the tens-of-minutes disk 28, the latter may be intermittently driven by the "minute" disk through a simple mechanism wherein a small amount of lost motion is involved. Accordingly, referring to Figs. 1 and 3, the disk 29 is provided with a pawl 29*d* pivotally mounted adjacent its periphery, and the side walls 28*d* of the cupped portion 28*a* of the tens-of-minutes disk is provided with a plurality of apertures 28*e* for engagement by the pawl 29*d*. The apertures 28*e* are ten in number, one for each of the numerals 28*b*.

Control of the pawl 29*d* is accomplished by means of a pin 29*e* rigidly carried by the pawl end, extending through a slot 29*f* (Fig. 1) in the periphery of the disk 29. A leaf spring 29*g* is secured to the inner surface of the disk 29, as by welding or other suitable means so that it may engage the pin 29*e* and yieldably hold the pawl 29*d* in the retracted position shown in Fig. 3.

For cooperation with the pin 29*e* at the front face of the dial 29, a bracket 31 is provided, mounted on the front surface of the frame plate 21 by screws 32 and having a camming flange 31*a* (Figs. 1 and 2) adapted to engage the pin 29*e* once during each revolution of the "minute" disk 29. Considering Fig. 1, the location of the flange 31*a* is such that when the numeral "nine" of the "minute" disk, during counterclockwise movements of the latter, begins to leave the sight opening 26, the pawl 29*d* will be swung outwardly by the flange and enter one of the apertures 28*e* of the tens-of-minutes disk 28. As the counterclockwise movement of the "minute" disk 29 continues, the pawl 29*d* will cause the tens-of-minutes disk 28 to be carried with it. When the numeral "nine" has completely left the sight opening 26 and the succeeding character "zero" fully entered the opening, the numeral "five" of the disk 28 will have left the sight opening and the succeeding character "zero" fully entered the opening. As this occurs, the pin 29*e* will leave and be disengaged from the flange 31*a*, whereupon the spring 29*g* will return the pawl to its normally retracted position. Thus, once during each revolution of the "minute" disk 29 the tens-of-minutes disk 28 will be advanced one-twelfth of a revolution.

A slight amount of lost motion is involved in the drive between the disks 29 and 28, this lost motion being mainly the result of the movement required of the disk 29 to advance the pawl 29*e* into engagement with the disk 28. Since the intermittent movement of the disk 29 is through one-tenth of a revolution, whereas the movement of the disk 28 is through one-twelfth of a revolution, the lost motion is accounted for by the difference in magnitude of these two movements.

Simplified means are provided by the invention for yieldably holding the disks 28 and 29 in their various intermittently-placed positions. Considering the tens-of-minutes disk 28, an arm 33 (Fig. 1) is lanced from the vertical frame plate 21 to extend forwardly thereof, this arm carrying a flat spring 34 the end 34*a* of which is made V-shaped to extend into the apertures 28*e* of the disk 28. The disk is thereby correctly positioned each time it is advanced one-twelfth of a revolution, it being yieldably held in its various rotative positions against accidental dislodgement and yet being movable when sufficient pressure is exerted by the pawl 29*d*, overcoming the restraint of the spring 34.

Figures 3, 10, 11:
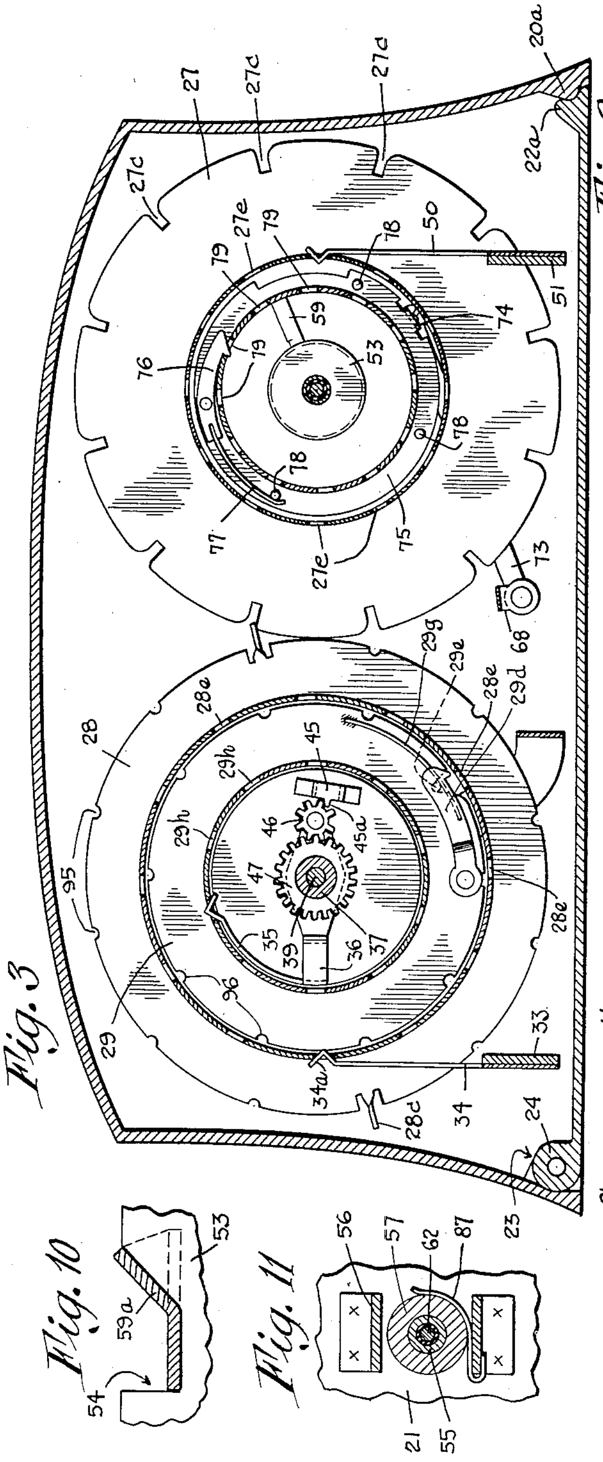
Fig. 3 is a vertical section taken on the line 3—3 of Fig. 2.
Fig. 10 is an enlarged fragmentary detail of the end-cam of the settable alarm-operating switch, the rotatable contact-carrying arm or follower for the cam being shown in section.
Fig. 11 is a fragmentary section taken on the line 11—11 of Fig. 7.

With regard to the detent for the disk 29, the cupped portion 29*a* thereof is apertured at ten equispaced points 29*h* as shown in Fig. 3, and a resilient detent spring 35 is provided, mounted on a frame 36 (Figs. 2 and 3) secured to the end of a stationary sleeve 37 fixedly carried by the frame 21. To securely hold the sleeve 37 in proper aligning position perpendicular to the plate 21 the latter is provided with a bracket 38 attached to its rear face, and encompassing the sleeve. The bracket 38, sleeve 37, and plate 21, may be secured together in any suitable manner as by welding.

A simplified drive is provided, according to the invention, between the "minute" disk 29 and the "second" disk 30. This latter disk is driven to turn continuously, and as shown in Fig. 2, is mounted on the end of a spindle 39 journaled in the sleeve 37, the other end of the spindle 39 carrying a gear wheel 40 engaged by a pinion 41 on the shaft of a synchronous drive motor 42 which may be of any suitable type having the proper speed and power, the motor being mounted on the frame plate 21 and energized through wires 43 and 44 as shown.

Referring to Figs. 1, 2, and 3, the rear face of the "second" disk 30 is provided with a bracket 45 having a laterally-extending lug 45*a* for periodic engagement with an idler pinion 46 mounted on the stationary frame 36 and meshing with a gear wheel 47 secured to the central cupped portion 29*a* of the disk 29. As seen in Fig. 2, the disk 29 and gear wheel 47 are centrally apertured so that they may be rotatably carried by the stationary sleeve 37. To provide a longer bearing surface for the disk, a cupped bearing plate 48 rotatably carried on the sleeve 37 is secured to the rear surface of the disk 29, thereby serving to steady the latter.

By this arrangement each revolution of the "second" disk 30 causes the lug 45*a* at the rear thereof to engage and drive through part of a revolution, the pinion 46 and therefore the gear 47 and disk 29 attached thereto. The amount of this movement is just sufficient to advance the "minute" disk 29 through one-tenth of a revolution, thereby substituting in the sight opening 26 the succeeding numeral carried by the disk.

The tens-of-minutes disk 28 is likewise centrally apertured and rotatably carried by the sleeve 37, its bearing surface being augmented by a cupped bearing plate 49 secured to the rear surface of the disk.

Referring to Fig. 1, the numerals 30*b* of the "second" disk 30 progress in steps of five. That is, twelve numerals are provided, starting with "0" and ending with "55," equispaced along the periphery of the disk and progressing counterclockwise, the direction of turning of the disk being clockwise.

A detent is also provided for the "hour" disk 27, the latter having a cupped central portion 27*d* (Fig. 2) with apertures 27*e* for engagement by a leaf spring 50 (Fig. 1) mounted on an arm 51 lanced from the frame 21.

The invention therefore provides by the above construction a simple time-indicating mechanism which may be mounted in a casing having comparatively small front-to-rear dimensions, the mechanism presenting through a central sight opening in the front of the casing, numerical indicia for indicating the time.

In operation, the "second" disk 30 is driven to turn clockwise continuously by the synchronous motor 42. The indicia 30b of the "second" disk become visible sequentially through the sight opening 26 of the casing. When the "55" numeral of the disk 30 leaves the sight opening 26 and the succeeding "0" numeral enters the sight opening, the drive mechanism between the disks 30 and 29 becomes operative so that the latter disk is rotated one-tenth of a revolution counterclockwise, thereby advancing the next "minute" digit for viewing through the sight opening. Also, each time the "minute" digit "9" leaves the sight opening 26 and the succeeding numeral "0" occupies the opening, the tens-of-minutes disk 28 will be advanced counterclockwise one-twelfth of a revolution, thereby presenting the next numeral of this latter disk in the sight opening. Each time a numeral "5" of the disk 28 leaves the sight opening 26 and the succeeding numeral "0" enters, the "hour" disk 27 will be advanced one-twelfth of a revolution, bringing into view the next succeeding "hour" numeral.

Thus, the time may be read from the disk 27, 28 and 29 accurately to within one minute, and by reading the "seconds" numerals on the disk 30, accurately to within five seconds.

According to the present invention a novel alarm mechanism is associated with the tens-of-minutes disk 28 and the "hour" disk 27 whereby an alarm may be given with but few, economically-produceable parts being required, and whereby a single knob may be employed for both shutting off the alarm and setting it.

This alarm, in the embodiment of the invention illustrated herein, comprises a sounding device which may be in the nature of an electrically-operated bell or buzzer, and circuit means for controlling the alarm, including a pair of switches one of which is manually operable between "on" and "off" positions, the other having means for setting it, and for automatically operating it in response to movement of the timing mechanism.

Figures 7, 8, 9:
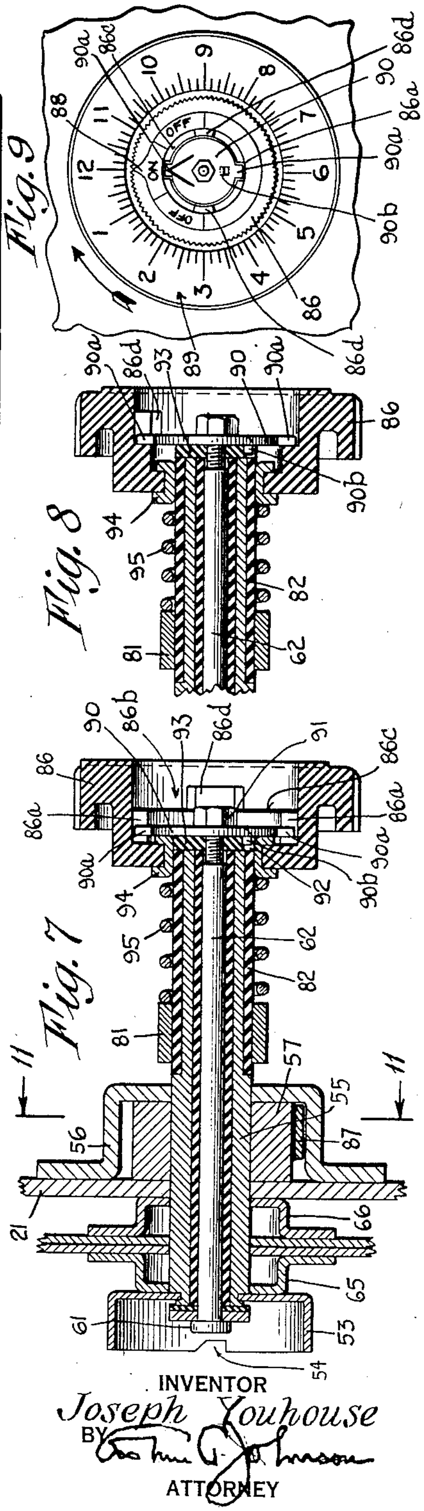
Fig. 7 is an enlarged, fragmentary axial vertical section of the spindle and switch mechanism associated with the "hour" member of the clock, the cut-off switch for the alarm being shown in closed-circuit position.
Fig. 8 is a fragmentary section showing the knob partially turned to hold the alarm cut-off switch of Fig. 7 in open-circuit position.
Fig. 9 is a fragmentary rear elevation of the alarm setting and control knob of the clock.

Accordingly, as shown in Fig. 2, a setable switch 52 is provided, mounted within the cupped portion 27d of the "hour" disk 27. The switch 52 comprises a base in the form of a cup 53 having a flange or lip which, Fig. 7, is provided with a cut or notch 54, so that the base may function as an end cam. The cup 53 is mounted on one end of a sleeve 55 which extends through and is rotatably carried by the frame plate 21 and by an apertured bracket 56 secured to the rear face of the plate. A collar 57 is provided on the sleeve 55 between the frame 21 and bracket 56, said collar being locked to the sleeve by a set screw 58 so that the sleeve is prevented from moving axially.

Associated with the base 53 is a resilient movable contact arm 59 (Figs. 1 and 2) having a contact button 60 for engagement with a stationary contact button 61, the latter being mounted on the end of a pin 62 insulatedly carried by and extending through the sleeve 55. The resilient contact arm 59 is rigidly mounted on an out-turned peripheral flange 63 of a cup 64 rotatably carried by the sleeve 55 within the cupped portion 27d of the "hour" disk, and is biased so that it continually presses against the camming edge of the switch base or cup 53, and functions as a cam follower.

To provide adequate bearing surfaces for the cup 64 and the disk 27, a pair of cupped bearing plates 65 and 66 are respectively secured to these members as shown in Fig. 2. The bottom surfaces of the cup 64 and the cupped portion 27d of the "hour" disk also engage each other to further steady these members and prevent wobble.

The resilient contact arm 59 is formed to have an angular offset portion 59a intermediate its ends, so that the shape of the arm at this point may conform in shape to the slot 54 in the cup 53 (Fig. 10). This enables the arm to readily ride up on the high edge portion of the base 53 after having entered the notch 54.

Means are provided for gearing the cup 64 to the tens-of-minutes disk 28 whereby counterclockwise turning of the latter will cause the cup to turn clockwise, and consequently rotate the contact arm 59 to traverse in a clockwise direction the camming edge of the switch base or cup 53. Once during each revolution of the cup 64, the contact arm 59 will drop into the notch 54, and when this occurs the contact buttons 60 and 61 will engage each other for closing the alarm circuit to cause the alarm to become operative. The gearing between the tens-of-minutes disk 28 and the cup 64 is such that the contact arm 59 is caused to traverse once every twelve hours the entire periphery of the base 53. In other words, the cup 64 will rotate a total of one revolution every tweleve hours, and at some time during this interval the contact arm 59 will drop into the notch 54 to cause the buttons 60 and 61 to engage each other. This gearing mechanism comprises a camming flange 67 carried by the tens-of-minutes disk 28. Preferably, as shown in Fig. 1 the flange 67 has a dished portion nested over the similarly-shaped portion 28a of the wheel 28. The peripheral camming edge 67a of the flange 67 is shown in broken outline, this edge having a pair of diametrically opposite steps 67b, the camming edge between the steps following generally the path of a portion of a spiral. The flange 67 has fingers 67c extending therefrom which engage the edges of apertures 67d of the wheel 28 to be driven by the latter when the wheel is rotated in the proper direction. Should the wheel 28 be rotated backwardly in setting the clock, the fingers will disengage the wheel and free the flange 67 of the same. For cooperation with the camming flange 67 a follower arm 68 is provided pivotally mounted at its upper end on the frame 21 by means of a screw 69. The follower arm 68 has a lateraly-extending finger 70, the end or follower portion 71 of which is bent at right angles for engagement with the periphery of the flange. A coil spring 71a is connected between the follower arm 68 and a bracket 72 mounted on the frame 21, for the purpose of yieldably holding a follower portion 71 of the arm against the cam periphery 67a. The lower end of the arm 68 is connected by a link 73 to a lug 74 carried by a ring 75 rotatable on the cylindrical exterior surface of the cup 64 (Figs. 2 and 3). The ring 75 pivotally carries a pawl 76 which is urged inwardly by a leaf spring 77 (Fig. 3) engaging a pin 78 carried by the ring, the pawl being adapted to extend into apertures 79 in the side walls of the cup 64. The ring 75 has a plurality of the pins 78, which extend towards and engage the inside bottom surface of the cupped portion 27d of the disk 27 to maintain proper alignment of the ring. Also, as seen in Fig. 1, the flange 63 of the cup 64 is provided with a plurality of lanced fingers 64a which are angularly extended to engage the ring 75 and space it in extent from the flange 63. In effect, therefore, a ratchet and pawl drive is provided between the ring 75 and the cup 64. Once every hour the follower arm 68 completes a single cycle of reciprocation, and therefore once every hour the cup 64 is turned through one-twelfth of a revolution, the pawl 76 entering a succeeding one of the apertures 79 at the time that a step 67b traverses the follower 71 of the arm 68.

An alarm magnet 80 is mounted on the frame 21 and connected electrically through the contact buttons 60 and 61 to be controlled thereby. This connection is accomplished as follows: One end of the magnet 80 is grounded to the frame plate 21. Since the contact arm 59 is carried by the cup 64 which is grounded to the frame 21, the coil 80 is thereby continuously connected with the contact button 60. The contact button 61 is carried by the pin 62, which is electrically connected in a manner to be hereinafter described, to a collector ring 81 rigidly secured on an insulating sleeve 82 encircling the bearing sleeve 55. A resilient brush 83 is insulatedly mounted on plate 83a on the frame 21 for continuous engagement with the collector ring 81. The circuit for the alarm is completed by wires 84 and 85 leading respectively from the ungrounded end of the magnet 81 and from the brush 83, and connecting with the wires 43 and 44. To provide for setting the alarm so that it will operate at a given predetermined time, a manually-operable knob 86 is mounted on and keyed to the sleeve 55 so that the latter may be given any desired rotative position by turning the knob. A friction device is provided to prevent inadvertent turning of the sleeve 55. Referring to Figs. 7 and 11, this device comprises a resilient member 87 carried by the bracket 56 and frictionally engaging the collar 57.

Referring to Fig. 9 the knob 86 is provided with a pointer 88, and the back of the casing 22 is provided with an annular scale 89 similar to the markings on the circular face of a conventional-type clock, but in the reverse order. The slot 54 in the switch base 53 is so located that the contact buttons 60 and 61 will be brought together to cause the alarm to become operative when the indicia carried by the disks 27, 28, and 29, correspond to the setting of the pointer 88 along the scale 89.

It will be seen therefore that the alarm mechanism may thus be set to become operative at any predetermined time in any given twelve-hour period, by merely setting the knob 86 to indicate this desired time on the scale 89, since the rotative position of the knob 86 determines the rotative position of the switch base 53 and therefore the position occupied by the notch 54, which latter position determines the closing of the circuit through the contact buttons 60 and 61.

According to the present invention means are provided under the control of the knob 86 for rendering the alarm inoperative at will. These means include a switch between the pin 62 and the collector ring 81, controllable in response to axial movement of the knob. Referring to Figs. 7 and 8 the pin 62 has a drive plate 90 secured to its end by means of a nut 91, the plate 90 having on its periphery a pair of diametrically-opposite lugs 90a extending into grooves 86a in the bore 86b of the knob 86. The drive plate 90 also has a lanced finger 90b extending into a slot 92 in an insulating washer 93 located between the drive plate and the end of the sleeves 55 and 82. When the nut 91 is securely tightened, the drive plate 90 will be rigidly held against turning with respect to the sleeve 55 and the switch base 53. The knob 86 is provided with a metal bushing 94 secured in its bore, one end of the bushing being adapted to engage the drive plate 90 and the other end being engaged by a helical compression spring 95 pressing against the collector ring 81. As shown in Fig. 7 a circuit is thereby completed between the contact button 61 and the collector ring 81, since a current can flow from the button 61 through the pin 62, drive plate 90, bushing 94, and coil spring 95, to the collector ring 81. However, if the knob 86 should be pushed inwardly as shown in Fig. 8, the bushing 94 will separate from the drive plate 90 thereby opening the circuit. To enable this to occur, the bushing 94 is made slidable on the sleeve 82 so that the knob 86 may be axially movable. The bore 86b of the knob 86 is provided with a shoulder or ledge 86c so that when the knob is pushed in, it may be turned to cause the lugs 90a of the drive plate 90 to engage the shoulder 86c and thereby prevent the knob from returning to its extended circuit-closing position. Projections 86d are also provided in the bore 86b so that the knob may not be turned more than one-fourth revolution with respect to the drive plate 90, without moving the latter. As a result, it is not possible for the pointer 88 to indicate anything but the correct setting of the alarm when the knob 86 is in its extended circuit-closing position, since the drive plate 90 can have only one relative circuit-closing position with respect to the knob 86.

There is thus provided by this invention a simple and convenient mechanism for setting the alarm to operate at any predetermined time, and for shutting off the alarm when desired.

To provide for convenient setting of the disks of the clock to the correct time when this is necessary, the peripheries of the disks 28 and 29 are provided with a plurality of equispaced notches 95 and 96 respectively into which a pointed implement may be inserted, for turning the disks without marring the faces thereof.

Figures 5, 6:
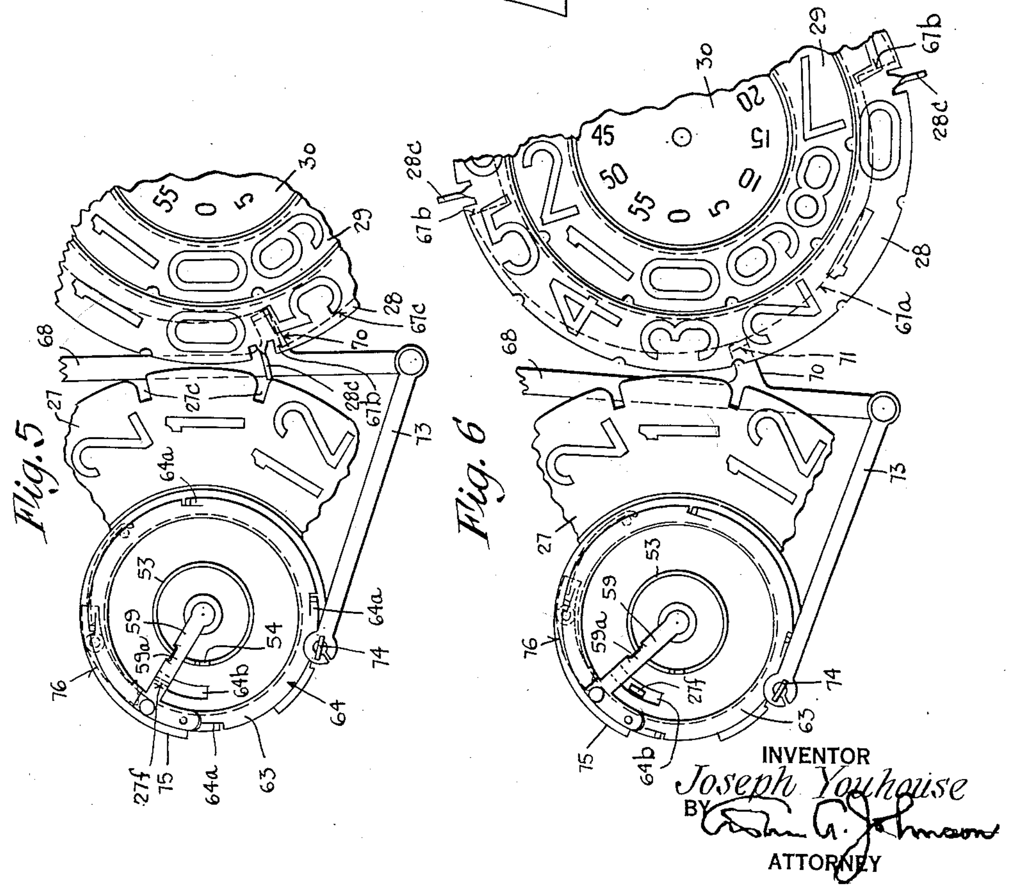
Fig. 5 is a fragmentary front elevation of the indicia-carrying members and control switch for the alarm of the clock, the members being shown in the position they occupy directly after the advance of the "hour" member by the tens-of-minutes member.
Fig. 6 is a similar view of the member, but showing their relative positions exactly thirty minutes after the positions of Fig. 5 were reached.

Means are provided by this invention for maintaining the correct setting of the alarm even through the "hour" disk 27 is manually adjusted or set independently of the tens-of-minutes disk 28, during the correcting of the timing mechanism. This means comprises a lost-motion drive between the "hour" disk 27 and the cup 64, in the form of a slot 64b in the bottom of the cup and a lug 27f lanced from the disk and extending into the slot. The lug 27f and slot 64b are so shaped and arranged that during the normal operation of the clock mechanism, the lug does not touch the edges of the slot. This is illustrated in Figs. 1, 5 and 6. In Fig. 1, the "hour" disk 27 is about to be advanced one-twelfth of a revolution by the tens-of-minutes disk 28. This is a comparatively rapid advancing movement, much more rapid than the movement of the cup 64. However, the lug 27f (Fig. 1) is near the bottom of the slot 64b and when this comparatively rapid advancing movement of the "hour" disk takes places, the lug will be moved to the top of the slot 64b as shown in Fig. 5 but will not engage the top edge of the slot. As the normal operation of the clock continues, the cup 64 will slowly turn so that the lug will be moved relatively to the slot towards the bottom of the latter again. When an hour has elapsed, the lug will be closely adjacent the bottom of the slot, whereupon when the "hour" disk is again quickly advanced the lug will travel to the top of the slot, this procedure being repeated continuously. However, if the "hour" disk 27 should be manually set independently of the other disks of the clock, and in being so set is moved through more than one-twelfth of a revolution clockwise, the lug 27f will engage the edge of the slot 64b so that the cup 64 will be carried with the "hour" disk to the new setting. Thereupon as the clock begins to operate normally under the power of the synchronous motor 42, the ratchet 76 will after a short interval, the length of which depends upon the exact setting of the cup 64, again engage the latter in one of the recesses 79 thereof and begin to advance the cup at the proper rate relative to the tens-of-minutes disk 28.

As a result of this arrangement it is impossible for the alarm mechanism to be inadvertently made inoperative when changing the setting of the clock disks manually, nor is it possible to alter the time setting of the alarm inadvertently so that it would have to be reset after correcting the setting of the dials or disks.

Variations and modifications may be made within the scope of this invention and portions of the improvements may be used without others.

I claim:

1. In an electric clock of the cyclometer type, a pair of substantially circular members mounted for rotation so that their edges extend adjacent each other, the members having indicia along said edges cooperating for indicating time; means for intermittently driving the members through predetermined partial revolutions, one member moving a predetermined number of times for each movement of the other member; an electric alarm; means for controlling said alarm to actuate the latter at a predetermined time, including a circuit provided with a switch having a base, a movable contact, and a rotatable operator for said contact, and including a ratchet for turning the operator and a cam mounted on the said one member for operating the ratchet; and means for rotatably adjusting the switch base to alter the time at which the alarm becomes operative.

2. In an electric clock of the cyclometer type, a pair of substantially circular members mounted for rotation so that their edges extend adjacent each other, the members having indicia along said edges, cooperating for indicating time; means for intermittently driving the members through predetermined partial revolutions, one member moving a predetermined number of times for each movement of the other member; an electric alarm; means for controlling said alarm, to actuate the latter at a predetermined time, including a circuit provided with a switch having a base, a movable contact, and a rotatable operator for said contact, and including a ratchet for turning the operator and a cam mounted on the said one member for operating the ratchet; means for rotatably adjusting the switch base to alter the time at which the alarm becomes operative; and a manually operable switch in said circuit, for rendering said alarm inoperative.

3. In an electric clock of the cyclometer type, a pair of substantially circular members mounted for rotation so that their edges extend adjacent each other, the members having indicia along said edges cooperating for indicating time; means for intermittently driving the members through predetermined partial revolutions, one member moving a predetermined number of times for each movement of the other member; an electric alarm; means for controlling said alarm, to actuate the latter at a predetermined time, including a circuit provided with a switch having a stationary base, a movable contact, and a rotatable operator for said contact geared to turn with the said one member; and rotatable means connected to the base for rotatably adjusting the stationary base whereby the time setting at which the alarm becomes operative may be varied.

4. The invention as defined in claim 3 in which the means for rotatably adjusting the stationary base includes a rotatable manually-operable knob having a key-and-slot driving connection with the base, said knob being axially movable without disturbing the setting of the base, and in which the circuit means for controlling the alarm includes switch means operated in response to axial movement of the knob whereby the alarm may be rendered operative or inoperative according to the axial position of the knob, the rotative position of the latter when connected for driving the base to set the alarm, determining the time at which the alarm would operate if not rendered inoperative.

5. The invention as defined in claim 3 in which the switch base comprises a circular end cam and a stationary contact mounted within same, and in which the rotatable operator comprises a follower engaging said cam and having contact means for engagement with the said stationary contact.

6. In an electric clock of the cyclometer type, a pair of substantially circular members mounted for rotation so that their edges extend adjacent each other, the members having indicia along said edges cooperating for indicating time; means for intermittently driving the members through predetermined partial revolutions, one member moving a predetermined number of times for each movement of the other member; an electric alarm; means for controlling said alarm, to actuate the latter at a predetermined time, including a circuit provided with a switch having a stationary base, a movable contact, and a rotatable operator for the movable contact geared to turn with the said one member; means for rotatably adjusting the stationary base whereby the time setting at which the alarm becomes operative may be varied; and a lost-motion driving connection between the rotatable switch operator and the said other member, said connection being inoperative during the normal time-indicating movements of the members, and becoming operative to turn the operator when the said other member is adjustably turned through one or a plurality of said partial revolutions in setting the clock, so that the time setting at which the alarm becomes operative is not thereby altered.

7. In an electric clock of the cyclometer type, a pair of substantially circular members mounted for rotation so that their edges extend adjacent each other, the members having indicia along said edges, cooperating for indicating time; means for intermittently driving the members through predetermined partial revolutions, one member moving a predetermined number of times for each movement of the other member; an electric alarm; means for controlling said alarm, to actuate the latter at a predetermined time, including a circuit provided with a switch having a base, a movable contact, and a rotatable operator for said contact, and including a ratchet for turning the operator and a cam mounted on the said one member for operating the ratchet; means for rotatably adjusting the switch base to alter the time at which the alarm becomes operative; and a lost-motion driving connection between the switch operator and the said other member, said connection being inoperative during the normal time-indicating movements of the members, and becoming operative to turn the operator when the said other member is adjustably turned through one or a plurality of said partial revolutions in setting the clock, so that the time setting at which the alarm becomes operative is not thereby altered.

8. In an electric clock of the cyclometer type, a pair of substantially circular members mounted for rotation so that their edges extend adjacent each other, the members having indicia along said edges cooperating for indicating time; means for intermittently driving the members through predetermined partial revolutions, one member moving a predetermined number of times for each movement of the other member; an electric alarm; means for controlling said alarm, to actuate the latter at a predetermined time, including a circuit provided with a switch having a stationary base, a movable contact, and a rotatable operator for said movable contact geared to turn with the said one member; means for rotatably adjusting the stationary base whereby the time setting at which the alarm becomes operative may be varied, said gearing enabling the operator to be moved independently of the member; and a driving connection between the switch operator and the said other member, said connection being inoperative during the normal time-indicating movements of the members, and becoming operative to turn the operator when the said other member is adjustably turned through one or a plurality of said partial revolutions in setting the clock, so that the time at which the alarm becomes operative is not thereby altered.

JOSEPH YOUHOUSE.

REFERENCES CITED

The following references are of record in the file of this patent:

UNITED STATES PATENTS

| Number | Name | Date |
|---|---|---|
| 1,841,746 | Lindsey | Jan. 19, 1932 |
| 1,906,716 | Putnam et al. | May 2, 1933 |
| 1,974,409 | Brower | Sept. 25, 1934 |
| 1,990,645 | Greenawalt | Feb. 12, 1935 |
| 1,991,241 | Bourquin | Feb. 12, 1935 |
| 2,396,947 | Gutteridge | Mar. 19, 1946 |
| 2,459,107 | Johnson | Jan. 11, 1949 |